(12) United States Patent
Franses et al.

(10) Patent No.: US 10,696,044 B2
(45) Date of Patent: Jun. 30, 2020

(54) AQUEOUS INK COMPOSITION

(71) Applicants: Hewlett-Packard Development Company, L.P., Houston, TX (US); Purdue Research Foundation, West Layfayette, IN (US)

(72) Inventors: Elias I. Franses, West Layfayette, IN (US); David S. Corti, West Layfayette, IN (US); Yung-Jih Yang, West Layfayette, IN (US); Hou T. Ng, Campbell, CA (US); Yan Zhao, Palo Alto, CA (US); Howard S. Tom, San Jose, CA (US)

(73) Assignees: HEWLETT-PACKARD DEVELOPMENT COMPANY, L.P, Spring, TX (US); PURDUE RESEARCH FOUNDATION, West Lafayette, IN (US)

( * ) Notice: Subject to any disclaimer, the term of this patent is extended or adjusted under 35 U.S.C. 154(b) by 136 days.

(21) Appl. No.: 15/509,774

(22) PCT Filed: Sep. 30, 2014

(86) PCT No.: PCT/US2014/058317
§ 371 (c)(1),
(2) Date: Mar. 8, 2017

(87) PCT Pub. No.: WO2016/053299
PCT Pub. Date: Apr. 7, 2016

(65) Prior Publication Data
US 2017/0247555 A1    Aug. 31, 2017

(51) Int. Cl.
*C09D 11/322*    (2014.01)
*B41J 2/01*    (2006.01)
(Continued)

(52) U.S. Cl.
CPC .............. *B41J 2/01* (2013.01); *C09D 11/033* (2013.01); *C09D 11/037* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 6,011,098 A    1/2000  Kashiwazaki et al.
6,682,590 B2   1/2004  Omatsu et al.
(Continued)

FOREIGN PATENT DOCUMENTS

| GB | 914889 A | * | 1/1963 | ............... C09C 3/08 |
| WO | WO-2013128449 | | 9/2013 | |
| WO | WO-2013170936 | | 11/2013 | |

OTHER PUBLICATIONS

The International Search Report and Written Opinion for International Application No. PCT/US2014/058317 dated May 28, 2015, 11 pages.

*Primary Examiner* — Manish S Shah
(74) *Attorney, Agent, or Firm* — HP Inc. Patent Department (57) ABSTRACT

Provided in one example herein is an aqueous ink composition, including: pigment particles having at least one metal oxide; an aqueous medium; and a cationic double-chain surfactant consisting a quaternary ammonium salt. Methods of making and using the ink composition are also provided.

17 Claims, 3 Drawing Sheets

(51) Int. Cl.
*C09D 11/037* (2014.01)
*C09D 11/38* (2014.01)
*C09D 11/326* (2014.01)
*C09D 11/033* (2014.01)

(52) U.S. Cl.
CPC .......... *C09D 11/322* (2013.01); *C09D 11/326* (2013.01); *C09D 11/38* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218

See application file for complete search history.

(56) References Cited

U.S. PATENT DOCUMENTS

| | | |
|---|---|---|
| 6,827,771 B2 | 12/2004 | Omatsu et al. |
| 7,175,268 B2 | 2/2007 | Taguchi |
| 7,291,212 B2 | 11/2007 | Taguchi |
| 7,311,393 B2 | 12/2007 | Taguchi et al. |
| 7,592,378 B2 | 9/2009 | Lin et al. |
| 7,850,774 B2 | 12/2010 | Oriakhi |
| 7,901,501 B2 | 3/2011 | Kobayashi |
| 8,552,090 B2 | 10/2013 | Kagata et al. |
| 2002/0175983 A1 | 11/2002 | Ishikawa et al. |
| 2003/0097959 A1 | 5/2003 | Omatsu et al. |
| 2006/0065156 A1* | 3/2006 | Ogawa .................. C09D 11/38 347/100 |
| 2007/0060670 A1 | 3/2007 | Ellis |
| 2007/0222811 A1* | 9/2007 | Yanagi .................. B41J 2/2114 347/21 |
| 2008/0131614 A1 | 6/2008 | Oriakhi |
| 2010/0321430 A1* | 12/2010 | Koganehira ......... C09D 11/322 347/9 |
| 2011/0033203 A1 | 2/2011 | Watanabe et al. |
| 2011/0300298 A1* | 12/2011 | Kamibayashi ......... C09D 11/38 427/256 |
| 2012/0168684 A1 | 7/2012 | Magdassi et al. |
| 2013/0253106 A1 | 9/2013 | Saito et al. |
| 2014/0171558 A1* | 6/2014 | Yatake ................. B41J 2/14201 524/84 |

\* cited by examiner

AQUEOUS INK COMPOSITION

BACKGROUND

Water-based inks containing dense inorganic particles tend to be unstable for uses in inkjet printing applications. The particles tend to sediment, or to aggregate and then to sediment, thereby adversely affecting the ink dispersion stability and jetting performance. Approaches to prevent aggregation and/or sedimentation often involve using excess amount of surfactants in the ink dispersion and/or agitating and/or recirculating the ink dispersion. However, the former generally does not overcome the challenges of sedimentation of high density inorganic pigments and may result in undesirable foaming, and the latter may be cumbersome and involve investment in new print head design and system architectures.

BRIEF DESCRIPTION OF THE DRAWING

The drawings are provided to illustrate various examples of the subject matter described herein related to an aqueous ink composition and are not intended to limit the scope of the subject matter. The drawings are not necessarily to scale.

DETAILED DESCRIPTION

Following below are more detailed descriptions of various examples related to an aqueous ink composition. The various examples described herein may be implemented in any of numerous ways.

Provided in one aspect of the examples is an aqueous ink composition, comprising: pigment particles comprising at least one metal oxide; an aqueous medium; and a cationic double-chain surfactant comprising a quaternary ammonium salt.

Provided in another aspect of the examples is an aqueous ink composition, comprising: pigment particles comprising at least one metal oxide; an aqueous medium; and vesicles comprising a cationic double-chain surfactant comprising a quaternary ammonium salt comprising a halogen anion.

Provided in another aspect of the examples is a method of making, comprising: shaking a solution comprising: pigment particles comprising at least one metal oxide; an aqueous medium; and a cationic double-chain surfactant comprising a quaternary ammonium salt comprising a halogen anion; and stirring the solution to form an ink composition.

Ink Composition

The ink composition described herein may comprise multiple suitable components. The ink composition may be an aqueous ink composition. The ink composition may be employed for any suitable type of printing. The printing may involve, for example, digital printing. The printing may involve, for example, inkjet printing. In one example, the printing involves propelling and disposing droplets of ink composition onto a substrate (e.g., paper, plastic, etc.). The ink composition described herein may be employed also in other types of printing involving an aqueous ink composition.

Pigment Particles

One component of the ink composition described herein may be pigment particles. A "pigment" in the context of an ink composition may refer to a particulate solid that may alter the appearance of an object by the selective absorption and/or scattering of light. The pigment particles may contribute at least in part to providing a color to the ink composition. In one example, a pigment is a colorant. The ink composition described herein may have any color. In one example, the ink composition is white. The term "white," when referred to an ink composition, may refer to various shades of white, including, for example, a slight tint of a different color—e.g., ivory white, pearl white, etc. Depending on the material chemistry, the pigment particles may have a relatively high density. In one example, a relative high density refers to a density of greater than about 1.5 $g/cm^3$—e.g., greater than about 2 $g/cm^3$, about 2.5 $g/cm^3$, about 3 $g/cm^3$, or higher.

The pigment particles may comprise any suitable material. The type of material employed may depend on, for example, the color intended for the pigment to provide. For example, the material may comprise an inorganic material, an organic material, or both. In one example, the material comprises an inorganic material. The inorganic material may comprise at least one ceramic. The ceramic may comprise a metal oxide. The metal oxide may comprise at least one of titanium dioxide (or "titania"), aluminum oxide (or "alumina"), and zinc oxide. In one example, the metal oxide comprises titania. In one example, the metal oxide comprises titania and the ink composition is white. In another example, the metal oxide comprises titania and the ink composition is not white. Depending on the application, other types of materials, including other types of metal oxides, may be employed.

The pigment particles in the ink composition may be covered with a layer, which provides, for example, suppression of catalytic effect of the pigment particles, particularly when the pigment particles comprise a metal oxide. The metal oxide, as will be described below, may be, for example, titania ($TiO_2$). This layer may encapsulate the pigment particle by encompassing the entire circumference of the pigment particle, or may cover only partially the circumference of the pigment particle. In one example, this layer comprises an inert oxide, such as silica. In another example, the layer comprises a thin layer, such as a monolayer, of at least one organic molecule. The organic molecule may comprise an alkysiloxane-based polymer. Other suitable types of polymers may be employed. This layer may be relatively thin, in comparison to the diameter of the pigment particle.

The pigment particles may have any suitable geometry. For example, the particles may be spherical, ellipsoidal, cubical, cylindrical, spiny, wire-like, sheet-like, flake-like, etc. The pigment particles may also have an irregular geometry. In one example, the pigment particles described herein are spherical, or almost spherical. The term "almost spherical" may refer to a shape that resembles a sphere but is not completely spherical, such as having a relatively small amount of irregularity deviating from a perfect spherical shape.

The pigment particles may have any suitable size. Depending on the geometry, the term "size" herein may refer to length, width, height, diameter, etc. Also, when referring to a plurality of objects, the value of any of the dimensions described herein may refer to a statistical average. In one example, the pigment particles have an average diameter of between about 100 nm and about 400 nm—e.g., between about 150 nm and about 300 nm, between about 200 nm and about 250 nm, etc. In one example, the pigment particles have an average diameter of between about 200 nm and about 300 nm. In one example, the pigment particles comprise titania, and these particles have an average diameter of about 260 nm. Other diameter values are also possible.

The pigment particles may be present in the ink composition at any suitable content value. The content herein may refer to volume percentage or weight percentage of the ink composition, depending on the context. In one example, the content refers to weight percentage. The pigment particles may be presented in the ink composition at less than or equal to about 30 wt %—e.g., less than or equal to about 25 wt %, about 20 wt %, about 15 wt %, about 10 wt %, about 8 wt %, or lower. In one example, the pigment particles are present in the ink composition at between about 3 wt % and about 30 wt %—e.g., between about 5 wt % and about 25 wt %, between about 8 wt % and about 20 wt %, between about 10 wt % and about 15 wt %, etc. Other values are also possible.

Aqueous Medium

The ink composition described herein may be an aqueous composition. Thus, one component of the ink composition described herein may be an aqueous medium. The aqueous medium may act as a carrier for the pigment particles in the ink composition. In one example, the pigment particles are dispersed in the carrier in the ink composition. The pigment particles may be dispersed in the carrier homogeneously or inhomogeneously. The aqueous medium may comprise water. The water may be, for example, deionized water.

Surfactant

Figure 1:
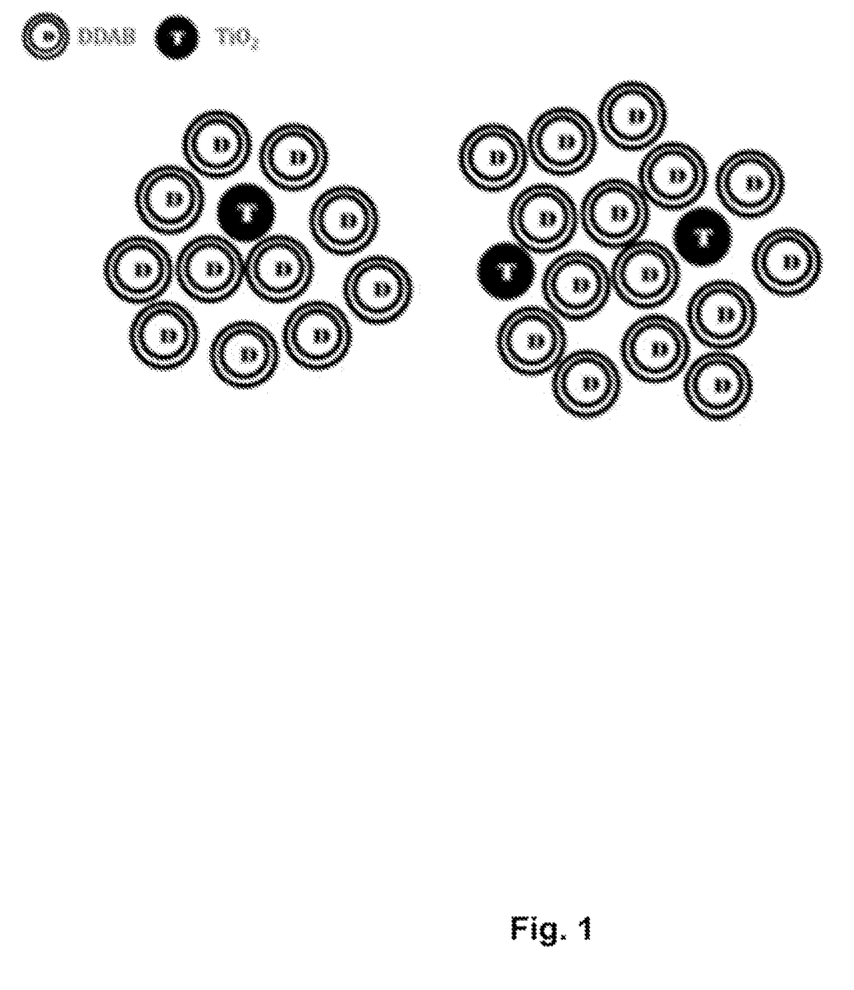
FIG. 1 is a schematic diagram showing, in one example, vesicles comprising didodecyl dimethylammonium bromide ("DDAB") as an example of a surfactant dispersed between titania as an example of pigment particles in an ink composition.

One component of the ink composition described herein may be a surfactant. A "surfactant" in the context of an ink composition may refer to a molecule that may lower the surface tension of the liquid carrier medium (e.g., a solvent) in which the molecule and/or the pigment particles are present. A surfactant may facilitate stabilization of pigment particles in the ink composition and/or act as a wetting agent to keep the surface tension of the liquid carrier medium low, such that the ink composition may interact favorably with a substrate after the composition is disposed over the substrate. A surfactant may comprise an organic molecule, an inorganic molecule, or both. A surfactant may be an ionic surfactant. The surfactant employed in the ink composition described herein may have any suitable material chemistry. For example, the surfactant may comprise any molecule that may form vesicles, as shown in FIG. 1. It is noted that while FIG. 1 shows one example of the surfactant as DDAB and one example of the pigment particles as titania, the surfactant need not be DDAB and the pigment particles need not be titania, as will be described further below.

Any suitable molecule capable of forming vesicles may be employed as a surfactant in the ink composition described herein. In one example, the vesicles described herein increase the effective volume fraction of the dispersed surfactant molecules in the ink composition and their viscosity at low shear stresses. Thus, the viscosity "felt" by the pigment particles may be higher than the viscosity determined from capillary viscometry. As a result, in this example these vesicles facilitate keeping the pigment particles dispersed. Not to be bound by any particular theory, but the motion of the pigment particles may be restricted by the presence of the vesicles. Also, not to be bound by any particular theory, but the sedimentation rate and inter-particle collision rate of the pigment particles may be impeded by the vesicles. As a result, the vesicles may prevent and/or mitigate agglomeration and/or sedimentation of the pigment particles.

One example of a vesicle-forming surfactant is a cationic double chain surfactant. The chain may be a linear chain or a branched chain of any suitable length. A "cationic surfactant" herein may refer to a surfactant, which when dissociated in water forms an amphiphilic cation and an anion. The anion may be a halogen anion. The surfactant may comprise a salt, such as an ammonium salt, such as a quaternary ammonium salt. A "quaternary ammonium salt" may refer to a salt of a quaternary ammonium cation and at least one anion. A "quaternary ammonium cation" may be a positively charged polyatomic ion of the structure $NR_4^+$, wherein R is an alkyl group or an aryl group. Unlike the ammonium ion ($NH_4^+$) and the primary, secondary, or tertiary ammonium cations, a quaternary ammonium cation in one example is permanently charged, independent of the pH of its solution. The anion in the quaternary ammonium salt may be, for example, a halogen anion. The anion may also be a hydroxide anion. The halogen anion may be, for example, a fluoride anion, chloride anion, bromide anion, iodide anion, or astatinide anion. In one example, the halogen anion is one of fluoride anion and a bromide anion. In one example, the halogen is a bromide anion. In one example, the halogen anion described herein is not a chloride anion.

The surfactant may comprise a cationic double-chain surfactant comprising a quaternary ammonium salt. The number of the vesicle-forming surfactants employed in the ink composition described herein need not be one; and, instead, multiple vesicle-forming surfactants as any of those described herein may be employed. In one example, the surfactant in the ink composition described herein comprises at least one of didodecyl dimethylammonium bromide ("DDAB") and dimethyl diocctadecyl ammonium bromide. DDAB may be employed as a multipurpose phase-transfer catalyst, and it may have a molecular structure as represented by Formula (I).

In another example, a cationic double-chain surfactant comprising a quaternary ammonium salt includes dioctadecyl dimethyl ammonium bromide (DODAB). In another example, the surfactant comprises at least one of didodecyl dimethylammonium chloride (DDAC) and didodecyl dimethylammonium hydroxide (DDAOH). Other suitable surfactants, including Aerosol-OT, such as sodium diethylhexyl sulfosuccinate and sodium dioctyl sulfosuccinate; dipalmitoyl phosphatidylcholine may be employed.

The surfactant described herein may be present in the ink composition at any suitable content value. As aforedescribed, the content herein may refer to volume percentage or weight percentage. In one example, the content refers to volume percentage. In one example, the vol % of the surfactant is at least about 15 vol % of the ink composition—e.g., at least about 20 vol %, about 25 vol %, about 30 vol %, about 40 vol %, about 50 vol %, about 60 vol %, or higher. In one example, the vol % of the surfactant is between about 25 vol % and about 50 vol % of the ink composition—e.g., between about 30 vol % and about 40 vol %, etc. Other values are also possible. The volume percentage of the surfactant in the ink composition may be larger than that of the pigment particles. In one example, the vol % of the surfactant may be at least about 2 times as much as that of the pigment particles—e.g., at least about 4 times, about 6 times, about 8 times, about 10 times, about 15 times, about 20 times, about 25 times, or higher. In one example, the vol % of the pigment particles described herein is less than or equal to about 10 vol % of the ink composition—e.g., less than or equal to about 5 vol %, about 2 vol %, about 1 vol %, about 0.5 vol %, about 0.25 vol %, about 0.2 vol %, or smaller. Because the surfactant generally has a lower density than the solid constituents of the ink composition (e.g., the pigment particles), the surfactant in the ink composition may have a lower wt % than those solid constituents, despite having a higher vol %.

The vesicles comprising the surfactant may have any suitable size. The vesicles may have the same size as the pigment particles. The vesicles may have a different size than the pigment particles. In one example, the vesicles have an average diameter of between about 50 nm and about 500 nm—e.g., about 100 nm and about 400 nm, about 150 nm and about 300 nm, about 200 nm and about 250 nm, etc. Other diameter values are also possible.

Additional Ink Composition Constituents

The ink composition may comprise additional constituents. For example, the composition may comprise at least one additional surfactant that is different from the aforedescribed vesicle-forming surfactant. The composition may comprise at least one of at least one co-solvent, at least one humectant, and at least one biocide.

The additional surfactant may be different from a cationic double-chain surfactant comprising a quaternary ammonium salt. Examples of an additional surfactant include tetraethylene glycol, glycerin (e.g., Liponic® EG-1 available from Lipo Chemicals, Inc., NJ, USA), acetylenic diol (e.g., Surfynol® SEF available from Air Products and Chemicals, Inc., PA, USA), ethoxylated nonionic fluorosurfactant (e.g., Zonyl® FSO available from Sigma-Aldrich Co., LLC), and the like. A co-solvent described herein may refer to a fluid carrier medium suitable for the pigment particles to be dispersed in. The co-solvent may be completely miscible or partially miscible with the aforedescribed aqueous medium. Examples of a co-solvent include 2-hydroxyethyl-2-pyrrollidinone, 2-pyrrollidinone, 1,6-hexanediol, 2-methyl-1,3-propanediol, and the like. A humectant may refer to a material suitable for retarding premature drying of the ink composition. Examples of a humectant include di-(2-hydoxyethyl)-5, 5-dimethylhydantoin ("Dantocol® DHE"), propylene glycol, hexylene glycol, butylene glycol, glyceryl triacetate, vinyl alcohol, neoagarobiose, glycerol, sorbitol, xylitol, maltitol, polydextrose, quillaia, glycerin, 2-methyl-1,3-propanediol ("MPDiol Glycol"), and the like. A biocide may refer to a material suitable for preventing and/or mitigating the presence and/or growth of microorganisms (e.g., fungi, bacteria, and the like). Examples of a biocide include a preservative, an antibacterial agent, an anti-fungal agent, etc. In one example, a biocide includes at least one of an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from the Dow Chemical Co.). Depending on the application, other suitable additives may also be employed in the ink composition. The aforedescribed additional constituents may be employed in any combination in the ink composition described herein.

Depending on the application, the aforementioned additional constituents may be present in the ink composition at any suitable content value. For example, the additional surfactant may be present at between about 0.05 wt % and about 15 wt %—e.g., between about 0.1 wt % and about 10 wt %, between about 0.5 wt % and about 5 wt %, between about 1 wt % and about 3 wt %, etc. Other values are also possible. The co-solvent may be present at between about 0.5 wt % and about 30 wt %—e.g., between about 1 wt % and about 25 wt %, between about 5 wt % and about 20 wt %, between about 8 wt % and about 15 wt %, etc. Other values are also possible. The humectant may be present at between about 0.05 wt % and about 20 wt %—e.g., between about 0.1 wt % and about 15 wt %, between about 2 wt % and about 10 wt %, between about 5 wt % and about 8 wt %, etc. Other values are also possible. The biocide may be present at between about 0.0005 wt % and about 10 wt %—e.g., between about 0.010 wt % and about 5 wt %, between about 0.05 wt % and about 2 wt %, between about 0.1 wt % and about 1 wt %, etc. Other values are also possible.

The ink composition may additionally comprise an optical spacer. An optical spacer may refer to a material that may enhance opacity of an ink composition (and ink film on a substrate), such as in a white ink composition. In one example, the optical spacer comprises latex nanoparticles. A nanoparticle herein may refer to a particle having a diameter in the nanometer range—e.g., less than or equal to about 500 nm, about 100 nm, about 50 nm, about 20 nm, or smaller. In one example, latex is an emulsion containing polymeric particles. The latex may be synthetic or natural. The latex may comprise any suitable material, such as styrene, butadiene, butyl acrylate, or a combination thereof. In one example, the latex comprises a combination of styrene and butyl acrylate. The latex nanoparticles may be physically and/or chemically modified at the surface to provide the desired functionality as an optical spacer, such as to increase opacity. The optical spacer may be present in at least some examples of the ink compositions described herein, but they do not need to be. In one example, the ink composition does not comprise any optical spacer. In one example, the ink composition does not comprise any optical spacer, such as being at least substantially free, such as being completely free, of an optical spacer, and the vesicle-forming surfactant of the ink composition act as both a dispersant and an optical spacer.

Due at least in part to the aforedescribed ink constituents and the characteristics thereof, the ink composition described in at least one example herein exhibits little, or minimal, such as no, observable aggregation and/or sedimentation. The lack of particle aggregation may be reflected in the dispersion stability of the pigment particles in the ink composition, the dispersion stability being a measure of particle size as a function of time. For example, a stable dispersion may refer to a particle dispersion with insignificant particle size increase (to form agglomerates) over a period of at least about 1 hour—e.g., at least about 2 hours, about 4 hours, about 6 hours, about 12 hours, about 18 hours, about 24 hours, about 48 hours, about 60 hours, about 72 hours, about 84 hours, about 4 days, about 5 days, about 6 days, about 10 days, about 15 days, about 20 days, about 25 days, about 30 days, or longer. In one example, an insignificant increase refers to less than or equal to about 50% increase in the diameter—e.g., less than or equal to about 30%, about 20%, about 10%, or smaller.

The stability of the ink composition described herein may also be reflected in the lack of sedimentation of the pigment particles over a relatively long period of time. In one example, in the ink composition described herein the pigment particles at least substantially do not sediment and instead remain suspended in the ink composition for at least about 1 hour—e.g., about 2 hours, about 6 hours, about 12 hours, about 24 hours, about 2 days, about 4 days, about 7 days, about 2 weeks, about 3 weeks, about 4 weeks, about 2 months, about 4 months, about 6 months, about 8 months, about 12 months, about 2 years, about 5 years, about 10 years, or longer. The term "at least substantially" in this example refers to at least 80% of the pigment particles—e.g., at least about 85%, about 90%, about 95%, about 99%, about 99.5%, or higher. In one example, the ink composition described herein achieves the stability described herein against aggregation and/or sedimentation without changing the viscosity of the aqueous medium, due at least in part to the surfactants as described herein. In another example, the ink composition described herein mitigates, minimizes, or even prevent entirely, agglomeration and sedimentation of the pigment particles, even though the particles may have a tendency to sediment with or without agglomeration.

The ink composition described herein may demonstrate good jetting characteristics and/or a relative high opacity in a printed ink composition. In one example, the ink composition maintains a favorable inkjet performance while remaining stable for substantial lengths of time, with little (such as with no) need for ink stirring or recirculation. In one example, the ink composition is white, and the printed ink composition may have an opacity (value) of at least about 40—e.g., at least about 45, 50, 55, 60, 65, 70, 75, or more. In one example, the printed ink composition has an opacity of between about 40 and about 70—e.g., between about 45 and about 65, between about 50 and 60, etc. In one example, the unit of opacity is %.

Making/Using the Ink Composition

Various methods of making and using the ink composition described herein are provided. In one example of making the ink composition, the method of making includes combining the different constituents of the ink composition, such as any of the aforedescribed constituents, to form an ink composition. The method of making may comprise shaking a solution comprising the ink composition, such as any of those described herein. The shaking may refer to mechanical shaking of a solution comprising the ink composition. The shaken solution may then be stirred. The stirring may involve mechanical stirring. In one example, the method of making further comprises a sonicating process applied to the stirred ink solution to form an ink composition. The sonication may involve ultrasonic sonication. In one example, the mechanical shaking is carried out by hand for 10-30 minutes; the mechanical stirring by magnetic stirring for 0.5-1.5 h at a speed of 500-2000 rpm; and the sonication by a bath sonication for 1-4 h at a frequency of 1-30 kHz. Other parameter values are also possible, depending on the techniques used and the materials involved.

The ink composition described herein may have any suitable composition/content. For example, the solid content of the ink composition may be of a certain value to facilitate the printing process. The solid content may refer to the wt % of a combination of the pigment particles and the optical spacer (should the spacer be present). For example, the solid content may be of the values of the pigment particle content as described above, particularly when little, or no, optical spacer is present. For example, the solid content may be less than or equal to about 25 wt %—e.g., less than or equal to about 20 wt %, about 15 wt %, about 10 wt %, about 5 wt %, about 1 wt %, or lower. In one example, the aforedescribed solid content may be desirable irrespectively of whether the optical spacer is present. In one example, the printing process, particularly the jetting performance of the printing process may be improved when the solid content is at the aforementioned level. The jetting performance may be described using any suitable metrics. For example, the jetting performance may be described using consistency in drop velocity, drop weight, puddle free orifice, and good decap performance, and/or wide jetting frequency range applicable.

The fabricated ink composition may be employed in any suitable application. For example, the ink composition may be disposed over a substrate to form a printed article. The disposition may involve any of the printing techniques described above, including inkjet printing. The inkjet printing may involve any suitable printing process that creates a digital image by propelling droplets of ink formulation onto a substrate (e.g., paper, plastic, etc.). An inkjet printer, such as those commercially available (E.g., those available from Hewlett-Packard Company) may be employed. In one example, the inkjet printer is a thermal printer. The inkjet printing may involve printhead(s) having a piezoelectric crystals. Another example of inkjet printing may be electrohydrohynamic ("EHD") printing, such as pyro-EHD. Any other suitable type of inkjet printing may be employed. The printer may be coupled to an additional device or system to monitor and/or control printing. Such a device may be, for example, a camera. The inkjet printing may involve continuous printing or drop-on-demand printing.

NON-LIMITING WORKING EXAMPLES

Example 1

Several titania-based aqueous ink dispersion samples having different types of surfactants were prepared. The average diameter of the titania pigment particles was about 260 nm. Five samples were prepared: (1) without surfactant ("None"); (2) sodium didodecyl sulfate ("SDS"); (3) Triton X-100 ($C_{14}H_{22}O(C_2H_4O)_n$) ("TX100"); (4) dodecyl trimethyl ammonium bromide ("DTAB"); and (5) didodecyl dimethyl ammonium bromide ("DDAB"). Surfactants (2), (3), and (4) are not cationic double chain surfactants comprising a quaternary ammonium salt. In all of the samples, 1 wt % $TiO_2$ particles were employed, and of the samples prepared with a surfactant, the surfactant at 1 wt % was employed—the balance of the sample composition is water. The $TiO_2$-vesicle water-based dispersions were prepared using two procedures:

(S) mechanical shaking, followed by mechanical stirring; and (SS) mechanical shaking, followed by mechanical stirring, and then sonication. In this Example, the mechanical shaking was carried out by hand for 30 minutes; the mechanical stirring by magnetic stirring for 0.5 h at a speed of 1400 rpm; and the sonication by a bath sonication for 4 h at a frequency of 4 kHz.

Figure 2:
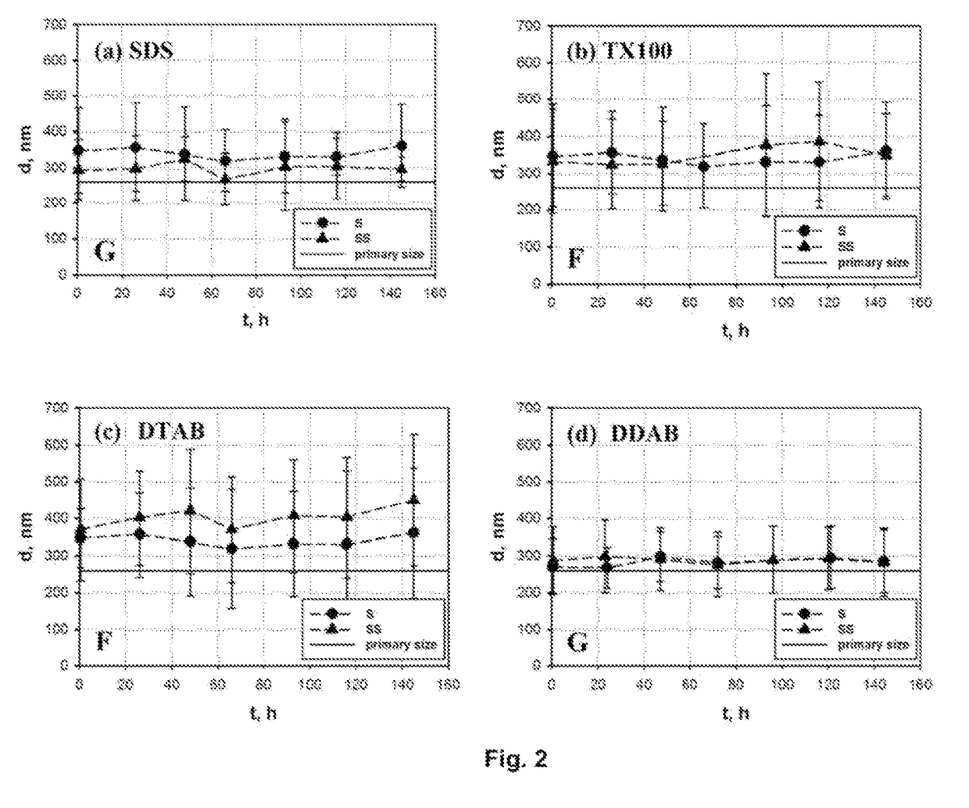
FIGS. 2(a)-2(d) show, in one example, the dispersion stability of the pigment particles against aggregation as a function of time using four different surfactants: (a) sodium dodecyl sulfate (SDS); (b) Triton X-100 ($C_{14}H_{22}O(C_2H_4O)_n$ ("TX100"); (c) dodecyl trimethyl ammonium bromide ("DTAB"); and (d) didodecyl dimethylammonium bromide ("DDAB").

The comparison results with respect to the dispersion stability are shown in Table 1 and FIG. 2. The sedimentation criterion as shown in Table 1 refers to the time for the particles to sediment by 0.5 cm. The time reported were obtained as $t_{0.5}$ (99%) values. The scores G refers to the sample with this time between 120 h and 1000 h; F with this time between 24 h and 20 h; P and VP with this time between 5 and 24 h, and <5 h, respectively.

Table 1 demonstrates that the dispersion with DDAB exhibits good stability against sedimentation for samples made by both of the (S) and (SS) approaches. It was observed that the stability of the sample with DDAB was better than SDS, which had better stability than the sample with DTAB, which had a better stability than the sample with TX100. The sample without any surfactant was found to exhibit very poor stability. Specifically, the samples with DDAB were stable for at least 5 days (for the samples obtained by the SS procedure) and 16 days (for those by the S procedure). Additionally, it was found that the (S) approach produced better results (in comparison to the (SS) approach) for the DDAB-containing sample, while the (SS) approach was better (than the (S) approach) for samples containing TX100, DTAB, and SDS.

TABLE 1

The dispersion stability comparison for samples prepared by the two approaches (S) and (SS). G = good; VP = very poor; P = poor; F = fair.

| Surfactant | S (h) | SS (h) |
| --- | --- | --- |
| None | <3 (VP) | <3 (VP) |
| SDS | 25 (F) | 38 (F) |
| TX100 | <21 (P) | <23 (P) |
| DTAB | <21 (P) | <23 (P) |
| DDAB | 400 (16 d) (G) | 120 (5 d) (G) |

FIGS. 2(a)-2(d) illustrate a contrast with respect to the dispersion stability (against particle diameter increases—e.g., as a result of aggregation) for the four samples containing the different surfactants. For this observation, each sample was diluted to 5 ppm before being subjected to dynamic light scattering ("DLS") observation. The capital letters at the lower left corners of FIGS. 2(a)-2(d) denote the aggregation stabilities of the respective samples. The aggregation stability criterion is based on how the particle sizes change in 120 h. If the particle sizes are smaller or close to 300 nm, which is the primary particle size, then a sample is scored Good (G). If the particles have sizes around 300-500 nm, then the sample is scored Fair (F). The aggregation stability criterion in FIGS. 2(a)-2(d) is not to be confused with the criteria as provided in Table 1. As can be seen in the figures, samples SDS and DDAB were determined each to have an aggregation stability score of G, while samples TX100 and DTAB were determined each to have an aggregation stability score of F. In particular, the sample with DDAB was the most stable against aggregation of all these samples and exhibited much lower increase in particle diameter than sample containing SDS, which exhibited lower increase than the samples containing TX100, and DTAB.

Example 2

Additional white ink compositions using the base $TiO_2$-vesicle dispersion as described in Example 1 were fabricated in this Example. The material parameters of the white inkjet dispersions are shown in Table 2. These dispersion compositions are outlined as follows:

1. $TiO_2$ pigment between 200-300 nm, with concentration ranging from 5-25 wt %.
2. Vesicle-forming surfactant such as DDAB, with concentration ranges from 1-20 wt %.
3. Surfactants such as tetraethylene glycol, Liponic® EG-1, Surfynol® SEF, Zonyl® FSO, with concentration ranges from 0.1 to 10 wt %.
4. Co-solvents such as 2-hydroxyethyl-2-pyrrollidinone, 2-pyrrollidinone, 1,6-hexanediol, and 2-methyl-1,3-propanediol, with concentration ranges from 1-20 wt %.
5. Humectants such as Dantocol-DHE, propylene glycol, hexylene glycol, butylene glycol, glyceryl triacetate, vinyl alcohol, neoagarobiose, glycerol, sorbitol, xylitol, maltitol, polydextrose, quillaia, glycerin, MP Diol, with concentration ranges from 0.1-15%.
6. Biocides with concentration ranges from 0.01-5 wt %.
7. Deionized water as the main carriers.

All of these ink compositions are white ink compositions. The samples were evaluated for inkjet testing performance, with respect to consistency in drop velocity, drop weight, puddle free orifice, and good decap performance, and wide jetting frequency. The inkjet testing involved a thermal inkjet printer, which has printheads capable of jetting <10 pL ink drops and is coupled with a high speed camera to capture the jetting dynamics and extract the information related thereto. Particularly, the puddling observation and drop velocity were obtained by using the video clips obtained by the high speed camera. The decap performance was evaluated where print heads were forced to sit idle and uncapped for various time intervals. Following those time intervals, solid area fills were printed while the printhead moved laterally across the page. In this example, the decap performance and frequency tests were performed with a standard test plot.

TABLE 2

Material parameters of several sample ink compositions

| | Sample 1 | Sample 2 | Comparative Sample 1 | Comparative Sample 2 |
| --- | --- | --- | --- | --- |
| $TiO_2$ (wt %) | 10 | 10 | 26 | 23 |
| DDAB (wt %) (by total) | 0.5 | 0.7 | 1.24 | 1.42 |
| DDAB (wt %) (by solvent) | 0.6 | 0.8 | 1.72 | 1.89 |
| Sol-1 (wt %) | 5.0 | 7.5 | 5.0 | 3.2 |
| Sol-2 (wt %) | 5.0 | 7.5 | 5.0 | 3.2 |
| Latex Particles | No | Yes | No | Yes |
| Latex (wt %) | — | 2.4 | — | 4.7 |
| Solid Content (wt %) | 10.1 | 12 | 27.7 | 29.8 |
| $TiO_2$: Latex (by volume) | — | 1:1 | — | 1.2:1 |
| Inkjet Testing | Good | Good | Poor | Poor |

A drop velocity of greater than 10 m/s, under regular firing conditions (15-24 V driving voltage; pulse width 2 μs) was obtained with the ink compositions as shown in Table 2. In Table 2, Sol-1 refers to 2-pyrrolidinone (2P); Sol-2 to 2-Methyl-1,3-propanediol (MPD); and the latex particles are styrene-containing latex particles. As shown in Table 2, it was found that the ink compositions having Sample 1 and Sample 2 exhibit better inkjet performance results than those having Comparative Sample 1 and Comparative Sample 2. In Table 2, the designation "Good" refers to a sample having a drop velocity of greater than about 8 m/s, orifice free of puddling. decap performance >5 minutes, and a jetting frequency 1 to 50 kH. A sample not satisfying the "Good" criteria are designated "Poor."

It was concluded that in this Example, solid content should be less than 20% for good jetting performance, with and without latex nanoparticles. Also, in this example, co-solvent content should be at least 5% (by weight) to facilitate good jetting performance.

Figure 3:
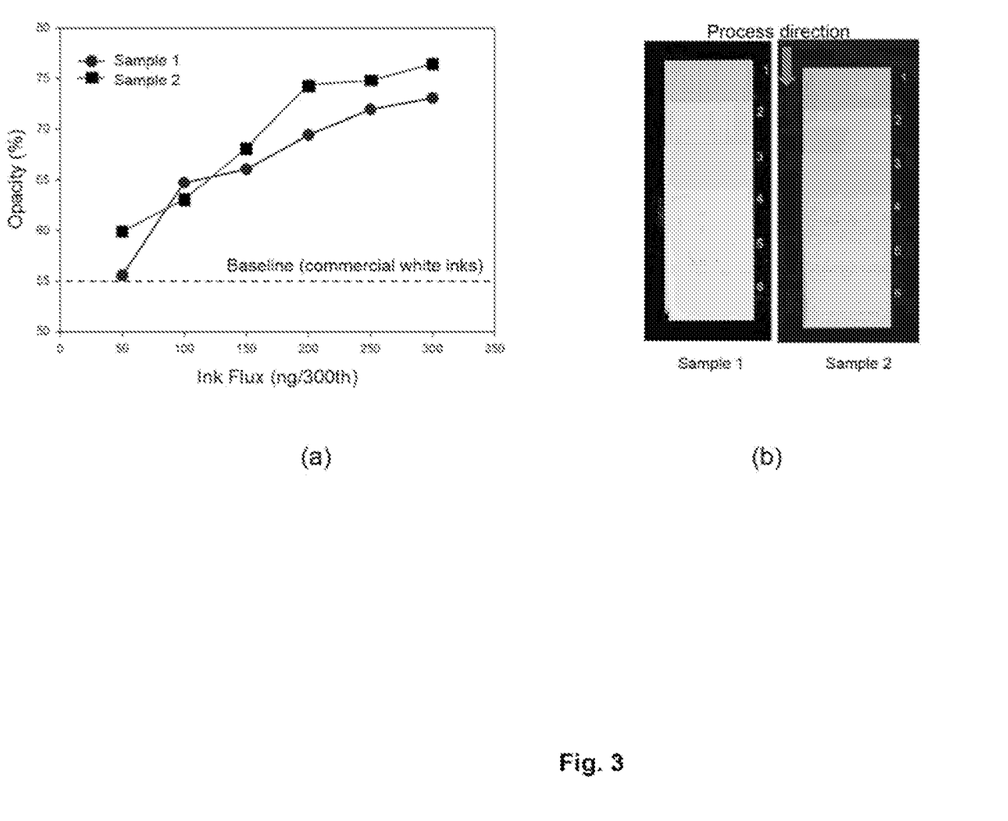
FIGS. 3(a)-3(b) show, in one example, the opacity values for two ink compositions: (a) shows the opacity of the two ink samples as a function of ink flux; and (b) shows optical images of these two ink samples illustrating their respective opacities.

FIG. 3(a) shows the level of white opacity attainable with Sample 1 and Sample 2 ink compositions as a function of the ink flux. FIG. 3(b) shows optical images of the Sample 1 and Sample 2 ink compositions as a function of printing depth. The results show increasing white opacity with increased number of passes—i.e., the topmost panel refers to 1-pass white patch, followed by 2-pass white patch, and so on. In addition, both show good uniformity of the jetting—i.e., white opacity is uniform within each patch. There is no missing lines, suggesting good nozzle health. Additionally, it was found that an opacity of greater than 55 was obtained with an ink flux of 50 ng/300$^{th}$. Also, it was observed that the latex nanoparticle appears to act as optical spacer to provide enhancement in white opacity. However, the results in this Example, particularly those for Sample 1 also indicated that DDAB may act both as a dispersant and an optical spacer, as evidenced in the fact that the sample with DDAB but without the latex nanoparticle optical spacer also exhibited good inkjet testing result.

Additional Notes

All literature and similar material cited in this application, including, but not limited to, patents, patent applications, articles, books, treatises, and web pages, regardless of the format of such literature and similar materials, are expressly incorporated by reference in their entirety. In the event that any of the incorporated literature and similar materials differs from or contradicts this application, including but not limited to defined terms, term usage, described techniques, or the like, this application controls.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

All definitions, as defined and used herein, should be understood to control over dictionary definitions, definitions in documents incorporated by reference, and/or ordinary meanings of the defined terms.

The indefinite articles "a" and "an," as used herein in this disclosure, including the claims, unless clearly indicated to the contrary, should be understood to mean "at least one." Any ranges cited herein are inclusive.

The terms "substantially" and "about" used throughout this disclosure are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Concentrations, amounts, and other numerical data may be expressed or presented herein in a range format. Such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 weight % (wt %) to 5 wt %" should be interpreted to include not only the explicitly recited values of 1 wt % to 5 wt %, but also include individual values and sub-ranges within the indicated range. Thus, included in this numerical range are individual values, such as 2, 3.5, and 4, and sub-ranges, such as from 1-3, from 2-4, and from 3-5, etc. This same principle applies to ranges reciting only one numerical value. Furthermore, such an interpretation should apply regardless of the breadth of the range or the characteristics being described.

The phrase "and/or," as used herein in this disclosure, including the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one example, to A only (optionally including elements other than B); in another example, to B only (optionally including elements other than A); in yet another example, to both A and B (optionally including other elements); etc.

As used in this disclosure, including the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, in some instances, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in this disclosure, including the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one example, to at least one, optionally including more than one, A, with no B present (and optionally including elements other than B); in another example, to at least one, optionally including more than one, B, with no A present (and optionally including elements other than A); in yet another example, to at least one, optionally including more than one, A, and at least one, optionally including more than one, B (and optionally including other elements); etc.

In this disclosure, including the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, § 2111.03.

The claims should not be read as limited to the described order or elements unless stated to that effect. It should be understood that various changes in form and detail may be made by one of ordinary skill in the art without departing from the spirit and scope of the appended claims. All examples that come within the spirit and scope of the following claims and equivalents thereto are claimed.

What is claimed:

1. An aqueous ink composition, comprising:
   pigment particles comprising at least one metal oxide;
   an aqueous medium; and
   a vesicle-forming cationic double-chain surfactant consisting of a quaternary ammonium salt selected from the group consisting of didodecyl dimethylammonium bromide ("DDAB"), dimethyl dioctadecyl ammonium bromide, didodecyl dimethylammonium chloride (DDAC), and didodecyl dimethylammonium hydroxide (DDAOH).

2. The aqueous ink composition of claim 1, wherein the composition is at least substantially free of latex nanoparticles.

3. The aqueous ink composition of claim 1, wherein the at least one metal oxide comprises at least one of titania, alumina, and zinc oxide.

4. The aqueous ink composition of claim 1, wherein the at least one metal oxide comprises titania.

5. The aqueous ink composition of claim 1, wherein the pigment particles are less than or equal to about 20 wt % of the aqueous ink composition.

6. The aqueous ink composition of claim 1, further comprising at least one of:
   a co-solvent;
   a humectant;
   a biocide; and
   an optical spacer.

7. The aqueous ink composition of claim 1, wherein the pigment particles are present in an amount of about 1 wt %, and the cationic double-chain surfactant is present is an amount of about 1 wt %.

8. The aqueous ink composition of claim 1, further comprising a co-solvent that is completely miscible with the aqueous medium or that is partially miscible with the aqueous medium.

9. The aqueous ink composition of claim 1, wherein the pigment particles are present in an amount of ranging from about 3 wt % to about 30 wt %, and the cationic double-chain surfactant is present is an amount ranging from about 1 wt % to about 20 wt %.

10. The aqueous ink composition of claim 1, wherein the at least one metal oxide is partially or fully covered by a layer of an inert oxide.

11. The aqueous ink composition of claim 10, wherein the inert oxide is silica.

12. The aqueous ink composition of claim 1, wherein vesicles comprising the cationic double-chain surfactant are dispersed between the pigment particles, the vesicles having an average diameter of between about 50 nm and about 500 nm.

13. The aqueous ink composition of claim 1, wherein the aqueous ink composition is stable over a period of at least about 5 days.

14. An aqueous ink composition, consisting of:
    pigment particles comprising at least one metal oxide;
    an aqueous medium; and
    a cationic double-chain surfactant consisting of a quaternary ammonium salt selected from the group consisting of didodecyl dimethylammonium bromide ("DDAB"), dimethyl dioctadecyl ammonium bromide, didodecyl dimethylammonium chloride (DDAC), and didodecyl dimethylammonium hydroxide (DDAOH).

15. A method of making, comprising:
    shaking a solution comprising:
       pigment particles comprising at least one metal oxide;
       an aqueous medium; and
       a vesicle-forming cationic double-chain surfactant consisting of a quaternary ammonium salt selected from the group consisting of didodecyl dimethylammonium bromide ("DDAB"), dimethyl diootadecyl ammonium bromide, didodecyl dimethylammonium chloride (DDAC), and didodecyl dimethylammonium hydroxide (DDAOH); and
    stirring the solution to form an ink composition.

16. The method of claim 15, further comprising sonicating the stirred solution to form the ink composition.

17. The method of claim 15, further comprising disposing the ink composition over a substrate to form a printed article.

* * * * *